G. W. UPTON.
FISHING REEL.
APPLICATION FILED JUNE 1, 1917.

1,286,193.

Patented Nov. 26, 1918.

Inventor:
George W. Upton

UNITED STATES PATENT OFFICE.

GEORGE W. UPTON, OF WARREN, OHIO.

FISHING-REEL.

1,286,193.   Specification of Letters Patent.   Patented Nov. 26, 1918.

Application filed June 1, 1917.  Serial No. 172,150.

*To all whom it may concern:*

Be it known that I, GEORGE W. UPTON, a citizen of the United States of America, residing at Warren, in the county of Trumbull and State of Ohio, have invented certain new and useful Improvements in Fishing-Reels, of which the following is a specification.

The present application is a continuation of previous application, Serial No. 837,097, which has now matured into a Patent No. 1,212,288.

The objects of this invention and application are, first, to provide additional and simple means for spooling incoming fishing lines on reels by mechanical means automatic in all respects except as to the rotation of the parts by turning the crank of the reel; and second, to more fully indicate the trend of possible modifications and mechanical equivalents for attaining the results following my prime and novel invention.

I attain these objects by the mechanism illustrated in the accompanying drawings in which—

Similar characters refer to like parts throughout the several views.

Figure 1:
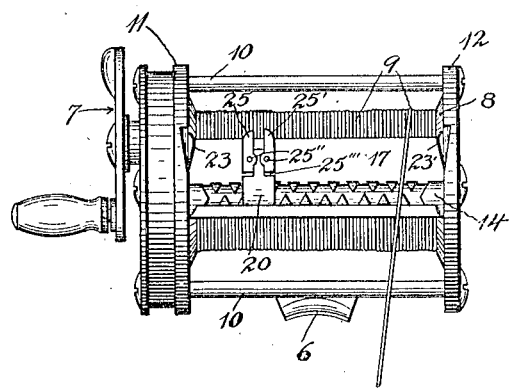
Figure 1 shows a fishing reel with one form of my invention attached.

As the general operation of level winding reels and the accomplishments of my improvements are set forth at length in my said referred to Patent No. 1,212,288, it will suffice to briefly repeat here that in bait casting, as the line goes off from the level winding reels heretofore invented the line carrier which serves to push the line from end to end of the spool has to operate with detrimental speed, though it operates slowly when winding in.

My improvements are to allow the line to run out freely without contact with the carrier; and have the latter pick up the line, or push it evenly from end to end of the spool, operating only when the line is winding in.

Referring to the drawings, the cross plate of a reel is designated by 6; the reel by 7; its spool by 8; a fishing line wound thereon 9; reel pillars by 10, 10; the head plate by 11; the tail plate by 12; a double or reverse threaded shaft by 14, parallel to the axle of the spool 8.

I introduce a line supporting member 17, which may be a rod, a bar, a plate or any equivalent element extending across the reel in front of the spool and between its end plates, and on which the line 9 must press when winding in from the first guide of the rod to and around the axle of the spool.

Such an element is absolutely necessary for the operation of any form or modification or improvement upon my line carriers described in my said former application and the modifications herein set forth; and as it is distinctly, broadly and specifically claimed in said Patent No. 1,212,288, I do not claim it here as a new element *per se;* but only in combination with the other operating elements of my present invention as clearly set forth in my subsequent claims.

Figure 2:
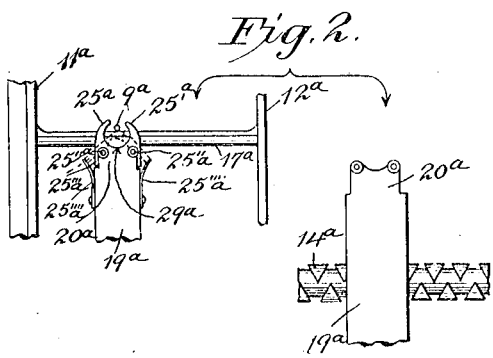
Fig. 2 shows a modification.

Without departing from my invention said element 17 may be of any form or material, either rigid or movable, provided it serves the purpose of keeping the incoming line below the highest point or points of the line carrier by reason of its upper horizontal surface being then positioned above a taut line from the first guide of the rod to the top of the coil on the spool, and also slightly below the protruding upper end of the carrier 19, as seen in Figs. 2 and 6.

On large reels, where there is room for the lateral movement of the prongs 25, 25', of the line carrier 19, the modification shown in Fig. 2 may be used, in which the prongs are attached to a plate 20ª, on pivots 25''ª, 25''ª, and have flat lower ends 25'''ª, 25'''ª, (slightly rounded at their extremities) which contact with the outside edges of carrier 19 to keep them erect as to exterior movement when the line presses against their inner faces after having been deposited between them; but the formation allows the line, 9, when coming from either side to knock down one prong and drop into the loop 29. Whereupon that prong is restored to an upright, line-retaining position, either by a spring 25'''''ª, Fig. 2, which could as well be attached to the head or tail plate of the reel or to the member 17ª, without departing from my invention; or by the greater weight of its end 25'''ª, if so constructed.

Figure 3:
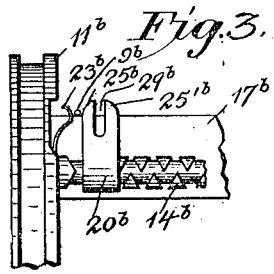
Fig. 3 shows a slight change in my device as shown in Fig. 1.

In Figs. 1 and 3 the member 17, above described, is illustrated as a plate which lies in part between the coiled line 9 on the spool 8 and in part is rounded up at the bottom to partly cover the shaft 14.

In Fig. 1 the plate 20 carries the pivoted prongs 25, 25' without any springs on said plate, but springs 23, 23' are shown attached to the head plate 11 and tail plate 12 in chambers to receive them and prevent their contact with the spooled line, although they can be attached to the member 17 when desirable.

The springs 23, 23' serve respectively to push down and inward the prongs 25 and 25' when met by them, and in that way deposit the line between said prongs in the loop 29.

In Fig. 3, a similar member 17 is shown and similar springs 23, 23', which are so shaped that when the carrier approaches either of them the spring slides the line up on to and over the respective prong 25 or 25' and the line 9 drops into the loop 29.

It is apparent that any skilled mechanic can devise a multitude of equivalents to the samples and modifications I have shown for descriptive purposes and illustration without departing from my invention, which I claim broadly and as being—

1. A line distributing mechanism for a level winding reel of the kind described, comprising a bifurcated carrier; right and left prongs; springs for mechanically and alternately raising and lowering said prongs as said carrier is guided to and fro between the end plates of said reel; a pawl and a reverse threaded shaft extended between said end plates, for the purpose set forth.

2. A terminal for the line carrier of a level winding reel of the class described, consisting of a plate with a plurality of prongs each pivoted to said carrier, rockable inwardly and retained upright as against outward movement.

3. In a level winding reel of the kind described, a line carrier consisting of a separate plate having right and left spring controlled elements alternately lowered by the respective lateral movements of a member operated by the travel of a guiding pawl in the channel of a reverse threaded shaft, and alternately raised by said springs for the purpose set forth.

4. In a level winding fishing reel of the kind described, the combination of the frame, pillars, spool, crank and gears, the reel, with a reverse threaded shaft in front of said spool and journaled in said frame; a pawl traveling in the thread of said shaft; a line carrier terminating in prongs and reciprocated by the coöperation of said pawl and shaft; right and left springs alternately compressed and released at the terminations of the right and left movements of said carrier, and an element to retain a fishing line slightly below the highest points of the line carrier.

5. In a fishing reel of the kind described and comprising a frame, a spool, a crank and gears; a reversely threaded shaft; an actuating pawl operating in conjunction therewith and a line carrier attached to said pawl and moved laterally by its operation; right and left springs automatically operated alternately thereby; in combination with a fishing line and a fishing rod having a line guide thereon.

In testimony whereof I affix my signature in presence of two witnesses.

GEORGE W. UPTON.

Witnesses:
M. L. RICE,
P. BETHUNE.